US 6,405,926 B1

(12) United States Patent
Yomogida et al.

(10) Patent No.: US 6,405,926 B1
(45) Date of Patent: Jun. 18, 2002

(54) STAND WITH A COMMUNICATION CAPABILITY FOR A BARCODE READER

(75) Inventors: Matsuo Yomogida; Kunihiko Kanehira; Hideaki Matsuda, all of Miyagi (JP)

(73) Assignee: Tohoku Ricoh Co., Ltd., Shibata-gun (JP)

( * ) Notice: Subject to any disclaimer, the term of this patent is extended or adjusted under 35 U.S.C. 154(b) by 0 days.

(21) Appl. No.: 09/386,165

(22) Filed: Aug. 31, 1999

(30) Foreign Application Priority Data

Sep. 1, 1998 (JP) ........................................... 10-246947
Jun. 23, 1999 (JP) ........................................... 11-177273

(51) Int. Cl.$^7$ ................................................. G06K 7/10
(52) U.S. Cl. ............................... 235/462.46; 235/462.43
(58) Field of Search ..................... 235/462.01, 462.43, 235/462.45, 462.46, 462.49, 472.01, 472.02, 472.03

(56) References Cited

U.S. PATENT DOCUMENTS

| 4,423,319 A | * | 12/1983 | Jacobsen ............... 235/472.03 |
| 4,736,096 A | * | 4/1988 | Ushikubo .............. 235/462.49 |
| 4,879,540 A | * | 11/1989 | Ushikubo .................... 235/385 |
| 4,956,783 A | * | 9/1990 | Teranishi et al. ... 235/462.01 X |
| 5,465,038 A | * | 11/1995 | Register ............ 235/462.46 X |
| 5,468,948 A | * | 11/1995 | Koenck et al. ........ 235/472.01 |
| 5,955,719 A | * | 9/1999 | Southworth et al. ... 235/472.03 |
| 6,056,196 A | * | 5/2000 | Konishi et al. ..... 235/462.45 X |
| 6,119,944 A | * | 9/2000 | Mulla et al. ........... 235/472.03 |
| 6,213,398 B1 | * | 4/2001 | Southworth et al. ... 235/472.03 X |
| 6,247,649 B1 | * | 6/2001 | Nada ...................... 235/462.45 |
| 6,311,896 B1 | * | 11/2001 | Mulla et al. ........... 235/472.03 |

FOREIGN PATENT DOCUMENTS

| JP | 2-26264 | | 6/1990 |
| JP | 3-44753 | | 4/1991 |
| JP | 3-80380 | | 4/1991 |
| JP | 3-110560 | | 11/1991 |
| JP | 5-54170 | | 3/1993 |
| JP | 7-271888 | | 10/1995 |
| JP | 9-237313 A | * | 9/1997 |
| WO | WO 89/04016 | * | 5/1989 |

* cited by examiner

*Primary Examiner*—Michael G. Lee
*Assistant Examiner*—Jared J. Fureman
(74) *Attorney, Agent, or Firm*—Oblon, Spivak, McClelland, Maier & Neustadt, P.C.

(57) ABSTRACT

A stand with a communication capability is formed with a communication pit in its top for receiving a pen type scanner. The communication pit is shaped complementarily to the scanner so as to prevent the scanner from shaking or rotating. An auxiliary circuit board stands upright on a printed circuit board built in the stand. An infrared transmission/receipt device is mounted on the auxiliary circuit board. The infrared transmission/receipt device faces an infrared communication port included in the scanner when the scanner is inserted into the communication pit.

27 Claims, 9 Drawing Sheets

STAND WITH A COMMUNICATION CAPABILITY FOR A BARCODE READER

BACKGROUND OF THE INVENTION

FIELD OF THE INVENTION

The present invention relates to a stand with an infrared communication capability for a barcode reader capable of surely transferring data read by the reader when the reader is mounted to the stand.

DISCUSSION OF THE BACKGROUND

Various kinds of equipment each including an infrared communication unit are available for the wireless interchange of data between computers or between computers and peripherals. IrDA standards were agreed upon in 1994 as standards for infrared communication and are formally adopted by, e.g., Windows 95 and 98 which are OS (Operating System) software for computers.

The above infrared communication unit is built in a computer beforehand or mounted to a computer in the form of an adapter, as the case may be. A barcode reader implemented as a pen type scanner is conventional. A pen type scanner with an infrared communication means built therein is available on the market for obviating a connection cord and thereby making the scanner easy to use. To send data read out of a barcode to a host computer via the communication unit, the operator holds the pen type scanner in such a position that the infrared communication port of the scanner accurately faces the infrared communication port of the computer. Should the port of the scanner be noticeably deviated from the port of the computer, the scanner would fail to send the data accurately. In practice, however, the operator has to operate the keys of the computer while transferring data from the scanner to the computer. This makes it difficult for the operator to hold the scanner in the above expected position and sometimes results in communication errors. Moreover, things around the infrared communication ports which would obstruct communication must be removed before the transfer of data from the scanner to the computer.

Technologies relating to the present invention are disclosed in, e.g., Japanese Patent Publication No. 2-26264, Japanese Patent Laid-Open Publication Nos. 3-80380, 5-54170 and 7-271888, and Japanese Utility Model Laid-Open Publication Nos. 3-44753 and 3-110560.

SUMMARY OF THE INVENTION

It is therefore an object of the present invention to provide a stand with an infrared communication capability for a barcode reader capable of surely transferring data read by the reader to a host computer when the reader is mounted to the stand.

It is another object of the present invention to provide a stand with an infrared communication capability for a barcode reader which is easy to use and saves power.

It is another object of the present invention to provide a stand with a communication capability for an image reading device capable of surely transferring data read by the device to an image processing apparatus when the device is mounted to the stand.

A stand for a barcode reader including an infrared transmission/receipt device of the present invention includes a holding mechanism for holding the barcode reader. An infrared communication unit implemented by an infrared transmission/receipt device interchanges data with the barcode reader. The infrared transmission/receipt device of the infrared communication unit is so positioned as to face the infrared transmission/receipt device of the barcode reader when the reader is held by the holding mechanism.

The above barcode reader is a specific form of an image reading device.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

To better understand the present invention, brief reference will be made to a conventional barcode reader system, shown in FIG. 1. As shown, the system includes an infrared communication unit 1 and a pen type scanner 10 capable of communicating with the communication unit 1. The communication unit 1 is connected to a host computer not shown. The communication unit 1 has an infrared transmission/receipt port 2 on its front. Infrared communication means is built in the scanner 10 in order to obviate a connection cord and thereby make the scanner 10 easy to use. To send data read out of a barcode to the host computer via the communication unit 1, the operator holds the scanner 10 in such a position that its infrared communication port 10a accurately faces the port 2 of the communication unit 1. Should the port 10a of the scanner 10 be noticeably deviated from the port 2 of the communication unit 1, the scanner 10 would fail to send the data accurately.

In practice, however, the operator has to operate the keys of the computer while transferring data from the scanner 10 to the communication unit 1. This makes it difficult for the operator to hold the scanner 10 in the above expected position. Moreover, things around the port 2 which would obstruct communication must be removed before the transfer of data from the scanner 10 to the communication unit 1.

A preferred embodiment of the stand in accordance with the present invention and modifications thereof will be described hereinafter. The stand has an infrared communication capability and is capable of removably holding an image reading device. In the embodiment and its modifications, the image reading device is implemented as a pen type scanner by way of example.

Figure 2:
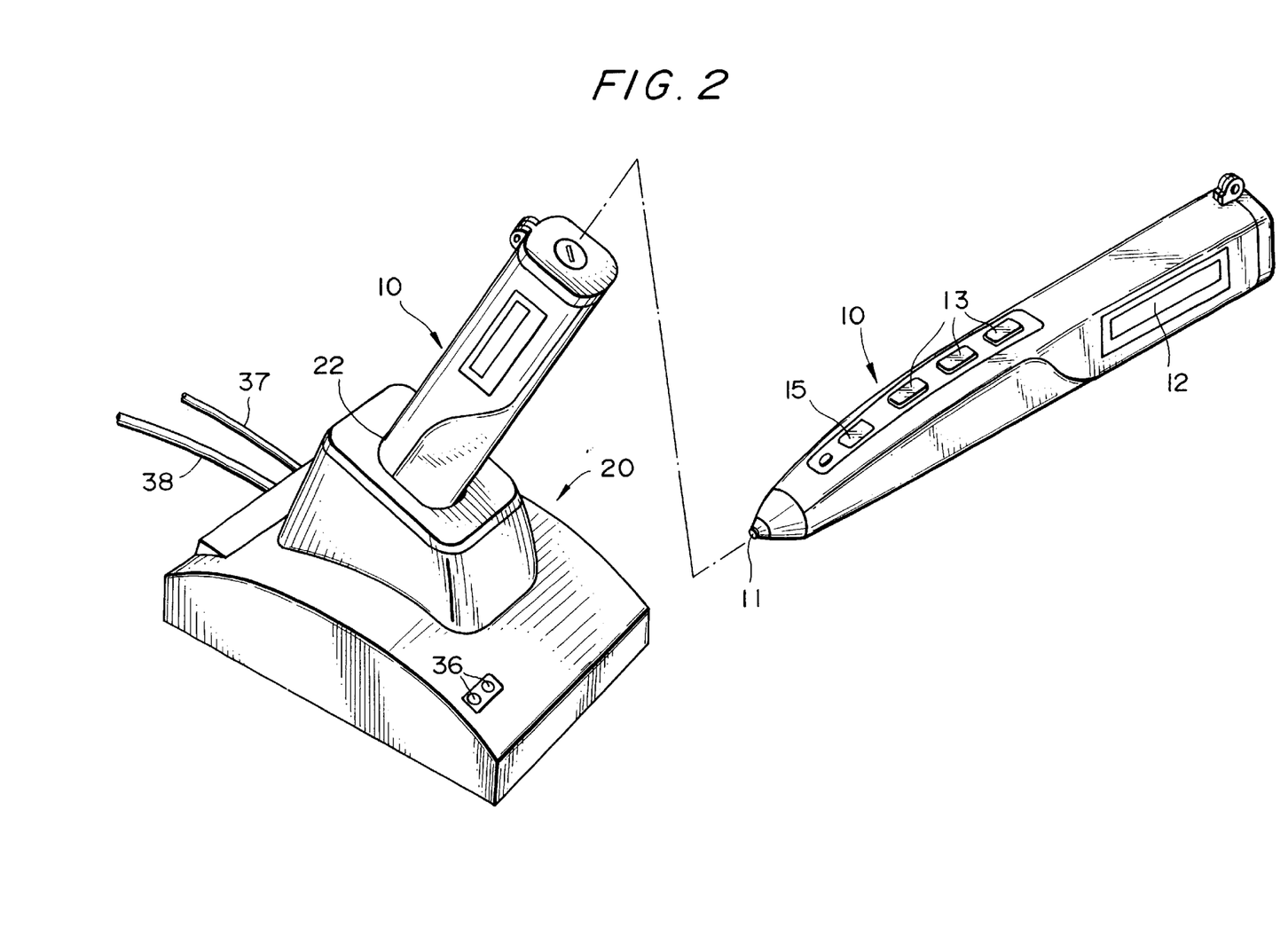
FIG. 2 is view showing a stand with an infrared communication capability embodying the present invention and a pen type scanner.
Figure 3:
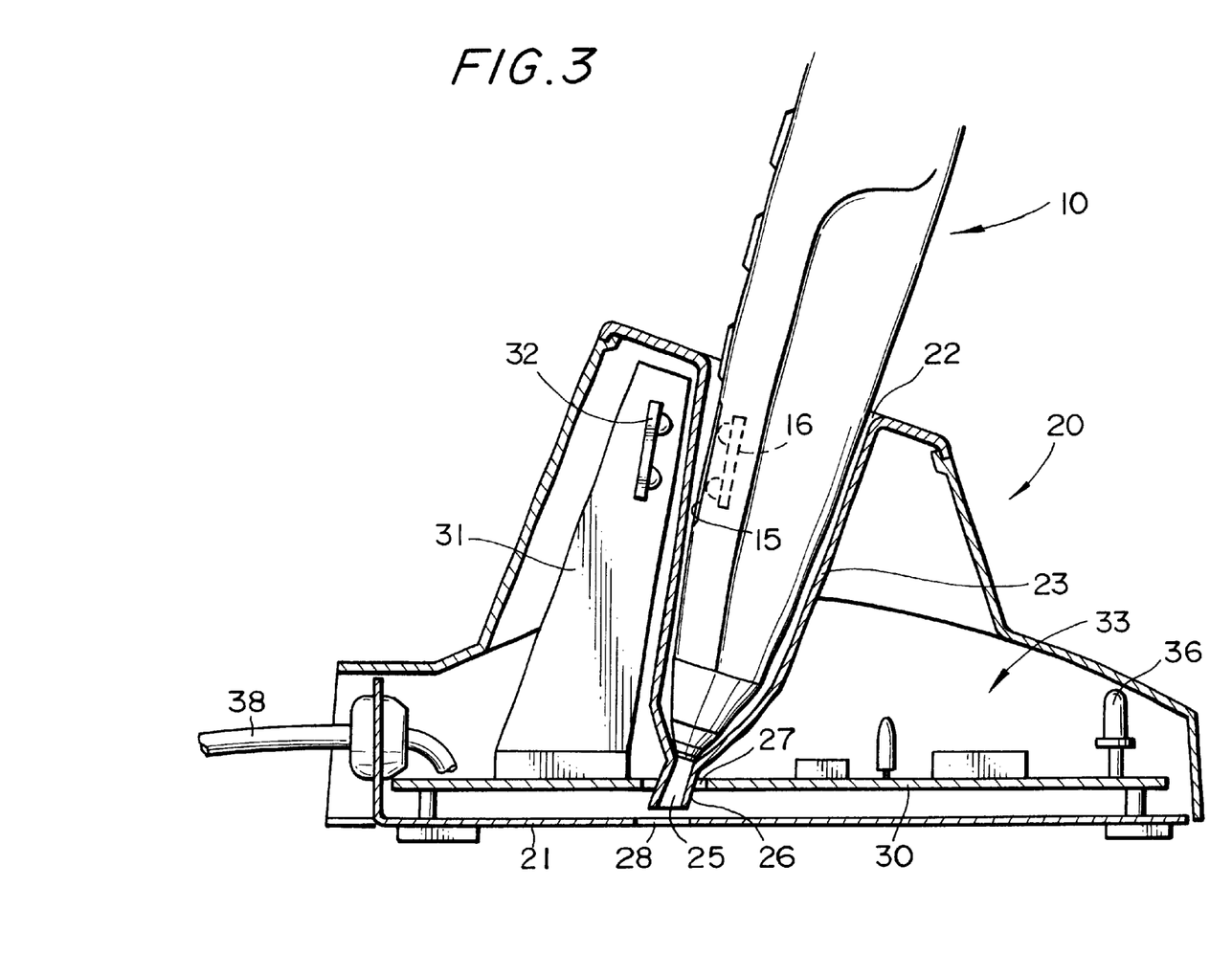
FIG. 3 is a sectional view of the stand shown in FIG. 2.

Referring to FIGS. 2 and 3, a stand 20 embodying the present invention is shown together with a pen type scanner or bar code reader 10 to be removaly mounted to the stand 20. The scanner 10 has a conventional configuration including an infrared communication unit. Specifically, the scanner 10 includes an elongate casing having a tip 11 for tracing a barcode at its one end. An LCD (Liquid Crystal Display) 12 is mounted on one side of the above casing. Further, a plurality of pushbutton switches 13 are arranged on another side of the casing, as illustrated. An infrared transmission/receipt device 16 is built in the casing beneath an infrared communication port 15.

The stand 20 is formed of plastics except for a bottom plate 21 thereof. A communication pit 22 is formed in the top of the stand 20 for receiving the tip portion of the scanner 10. The communication pit 22 is shaped complementarily to the scanner 10 so as to prevent the scanner 10 inserted therein from shaking or rotating.

More specifically, the stand 20 includes a hollow member 23 forming the communication pit 22. A hole 25 is formed in the bottom of the hollow member 23 for causing dust to drop via the hole 25 without staying in the pit 22. A printed circuit board 30 and the bottom plate 21 are respectively formed with holes 27 and 28, so that dust dropped via the hole 25 does not deposit on the circuit board 30 or the bottom plate 21. A narrow tube defining the hole 25 extends downward from the hollow member 23. The printed circuit board 30 is mounted on the bottom plate 21.

An auxiliary circuit board 31 is mounted on the printed circuit board 30 via a socket in an upright position. An infrared transmission/receipt device 32 is mounted on the auxiliary circuit board 31 and implemented by an infrared LED (Light Emitting Diode) and a photodiode. When the scanner 10 is inserted into the hollow member 23 of the stand 20, the transmission/receipt device 32 faces the communication port 15 of the scanner 10 with the intermediary of the wall of the member 23.

Figure 1:
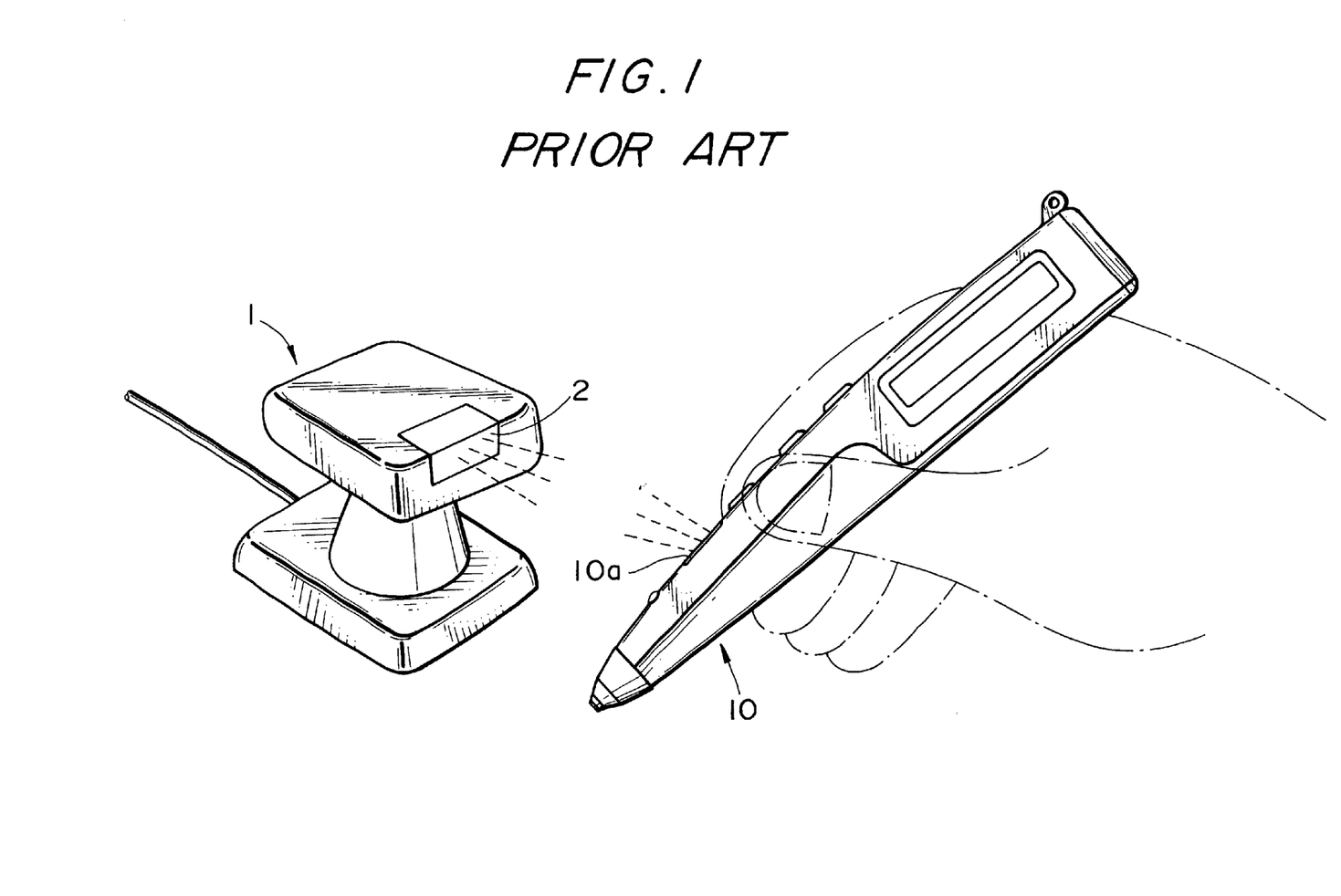
FIG. 1 is a view showing a conventional infrared communication unit and a pen type scanner communicating with each other.

A communication unit 33 is built in the stand 20 is similar to the conventional general-purpose infrared communication unit 1, FIG. 1. Power is fed to the communication unit 33 via an AC adapter not shown. There are also shown in FIGS. 2 and 3 a power supply/communication lamp 36, a power supply cord 37, and a signal line 38 connected to a serial port included in a host computer not shown.

In operation, the operator reads a barcode with the scanner 10, presses a preselected one of the pushbutton switches 13 for setting up a transmission mode, and then inserts the scanner 10 into the communication pit 22 of the stand 20 in order to transfer data to the host computer. In this condition, the infrared transmission/receipt device 16 of the scanner 10 faces the infrared transmission/receipt device 32 of the stand 20, as shown in FIG. 3. The two devices 16 and 32 are therefore ready to interchange infrared signals with each other. Subsequently, the operator presses another pushbutton switch 13 for sending data stored in the scanner 10 to the host computer having been prepared for receipt. If desired, the operator may insert the scanner 10 into the pit 22 and then operate the above pushbutton switch 13 assigned to the transmission mode.

After the data transfer from the scanner 10 to the host computer, the scanner 10 is left in the communication pit 22. The operator may again pick up the scanner 10 for reading another bar code later.

Figure 4:
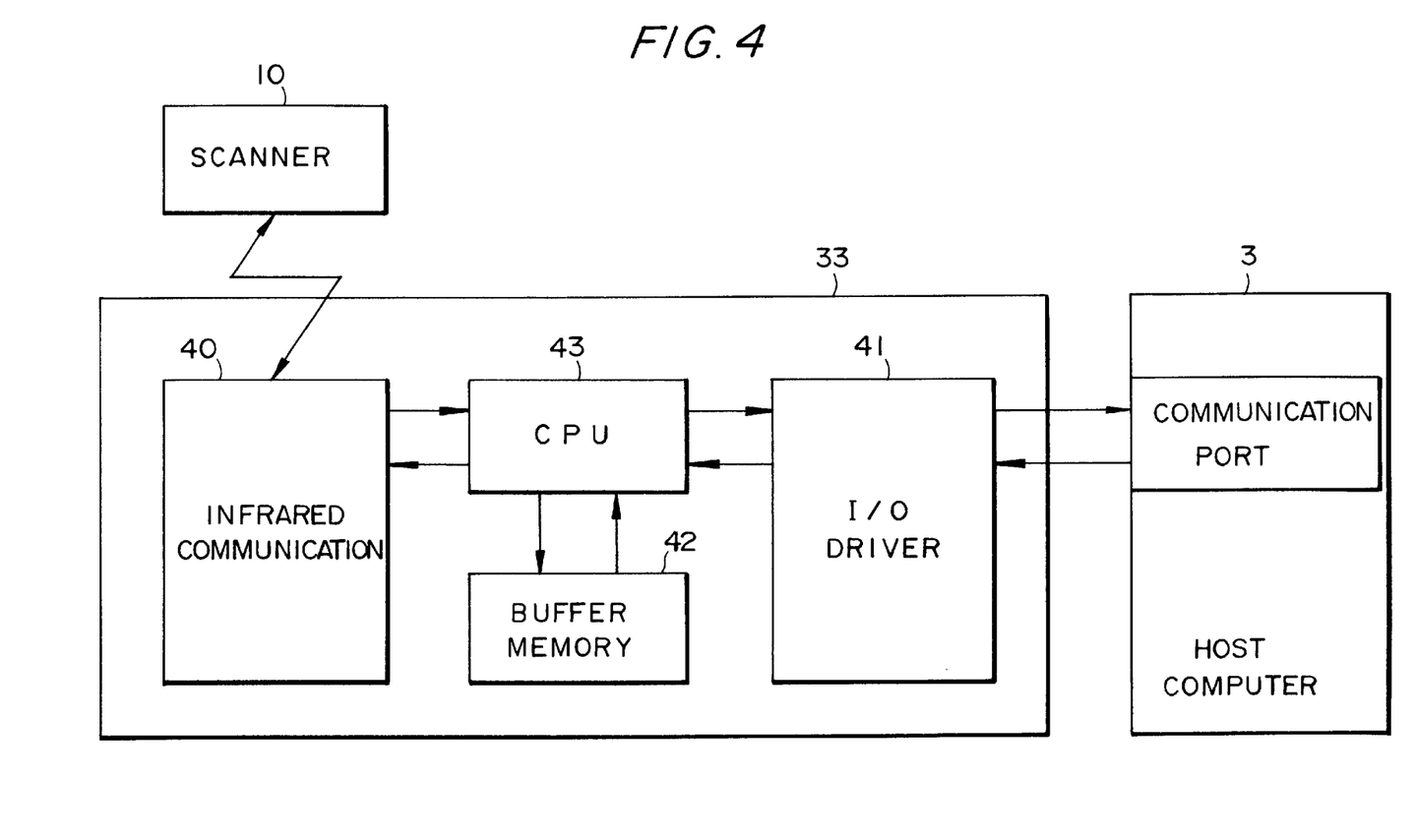
FIG. 4 is a block diagram schematically showing an infrared communication unit included in the illustrative embodiment.

If the host computer is not ready to receive data when the scanner 10 is inserted into the communication pit 22 to the stand 20, the scanner has to simply wait in the pit 22. FIG. 4 shows specific circuitry for solving this problem. As shown, the communication unit 33 built in the stand 20 includes an infrared communication member 40, an I/O (Input/Output) driver 41, a buffer memory 42, and a CPU (Centra Processing Unit) 43. The buffer memory 42 and CPU 43 are connected between the infrared communication 40 and the I/O driver 41. The data received from the scanner 10 is temporarily written to the buffer memory 42. The scanner 10 can therefore transfer stored data to the buffer memory 42 immediately after the scanner 10 has been mounted to the stand 20, i.e., without waiting until a host computer 3 becomes ready to receive data. This allows the operator to perform another operation immediately. As soon as the host computer 3 is prepared for the receipt of data, the data stored in the buffer memory 42 are transferred to the computer 3, and the memory 42 is cleared.

Figure 5A:
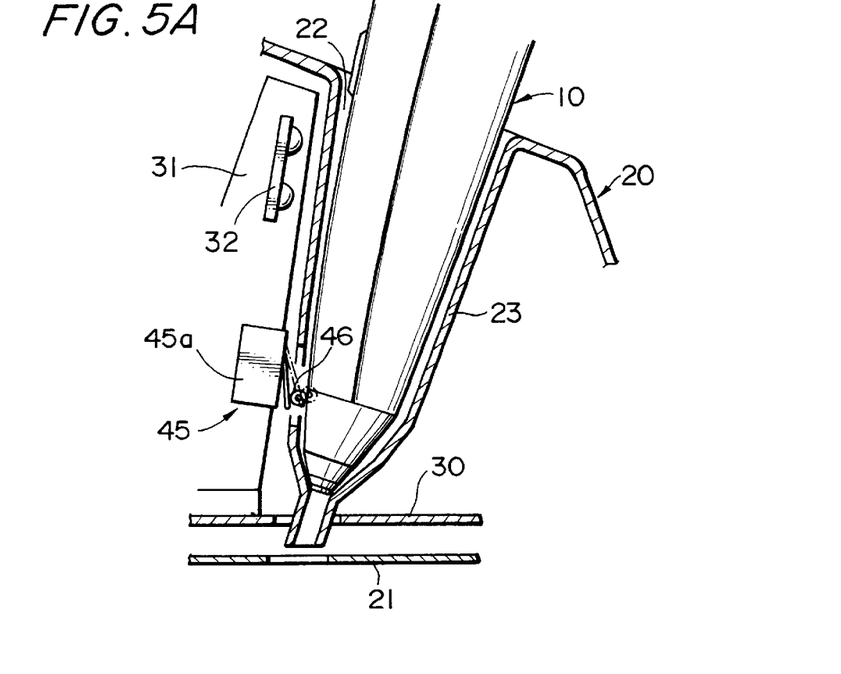
FIGS. 5A and 5B are fragmentary sectional views each showing a particular modification of the illustrative embodiment.
Figure 5B:
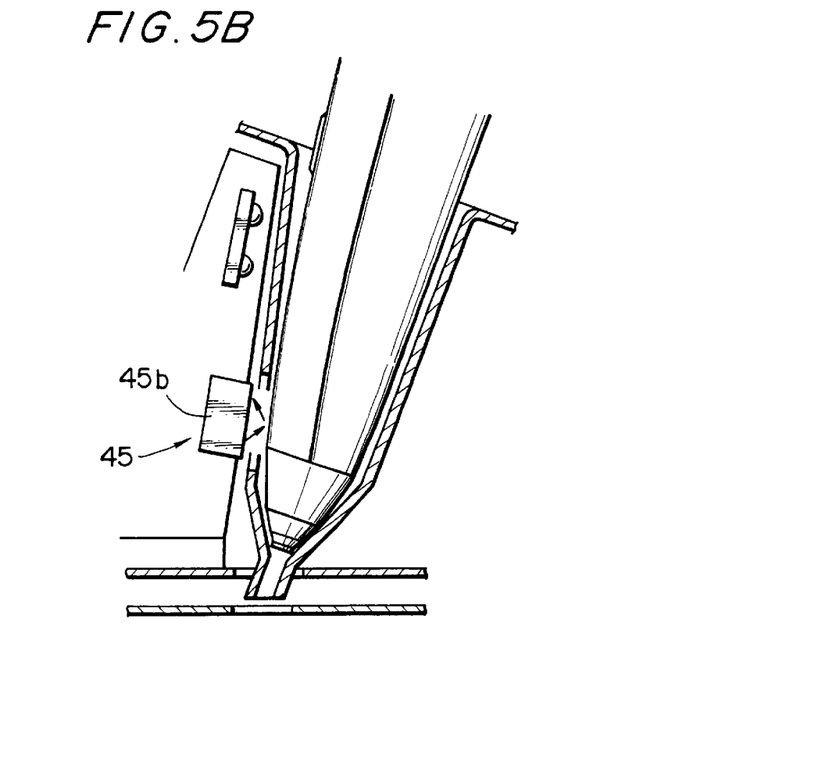

FIGS. 5A and 5B each show a particular modification of the above embodiment. The modifications to be described each include a sensor 45 responsive to the scanner 10 inserted into the communication pit 22 of the stand 20. In FIG. 5A, the sensor 45 is implemented by a limit switch 45a including a feeler 46 and mounted on the auxiliary circuit board 31. The feeler 46 protrudes into the communication pit 22 via a hole formed in the hollow member 23. When the scanner 10 is inserted into the pit 22, it pushes the feeler 46 out of the pit 22, as indicated by a solid line. As a result, the status of the limit switch 45a changes. In FIG. 5B, the sensor 45 is implemented by a reflection type photosensor 45b. When the scanner 10 is inserted into the communication pit, light issuing from the photosensor 45b is reflected by the scanner 10 and incident to the photosensor 45b.

In any case, only when the sensor 45 senses the scanner 10 inserted into the communication pit 22, power is fed to the communication unit 33 of the stand 20. This is successful to save power to be consumed by the stand 20.

Figure 6:
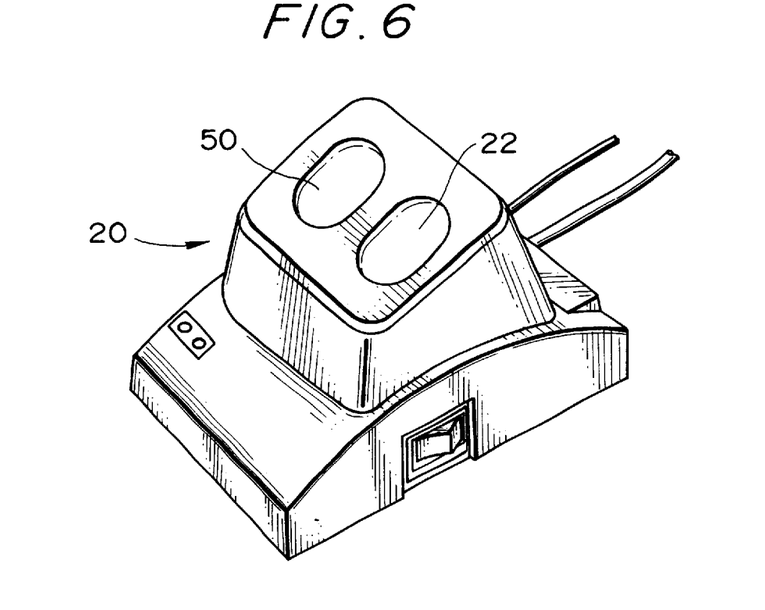
FIG. 6 is an external perspective view showing another modification of the illustrative embodiment.

FIG. 6 shows another modification of the illustrative embodiment. As shown, the stand 20 is formed with an auxiliary pit 50 in addition to the communication pit 22. The communication pit 22 is provided with the infrared communication unit 33 and sensor 45, FIG. 5A or 5B. The auxiliary pit 50 is a simple pit lacking the infrared communication unit 33 and sensor 45. Because the upper ends of the two pits 22 and 50 have an identical shape, indications for distinguishing the pits 22 and 50 are provided around their upper ends. In the event of data transfer, the operator inserts the scanner 10 in the communication pit 22. At this instant, the sensor 45 senses the scanner 10 and causes power to be automatically fed to the stand 20. The operator may insert the scanner 10 in the auxiliary pit 50 when intending to simply put the scanner 10 on the stand 20; in this case, no power is fed to the stand 20. Such selective use of the two pits 22 and 50 is also successful to save power.

Figure 7:
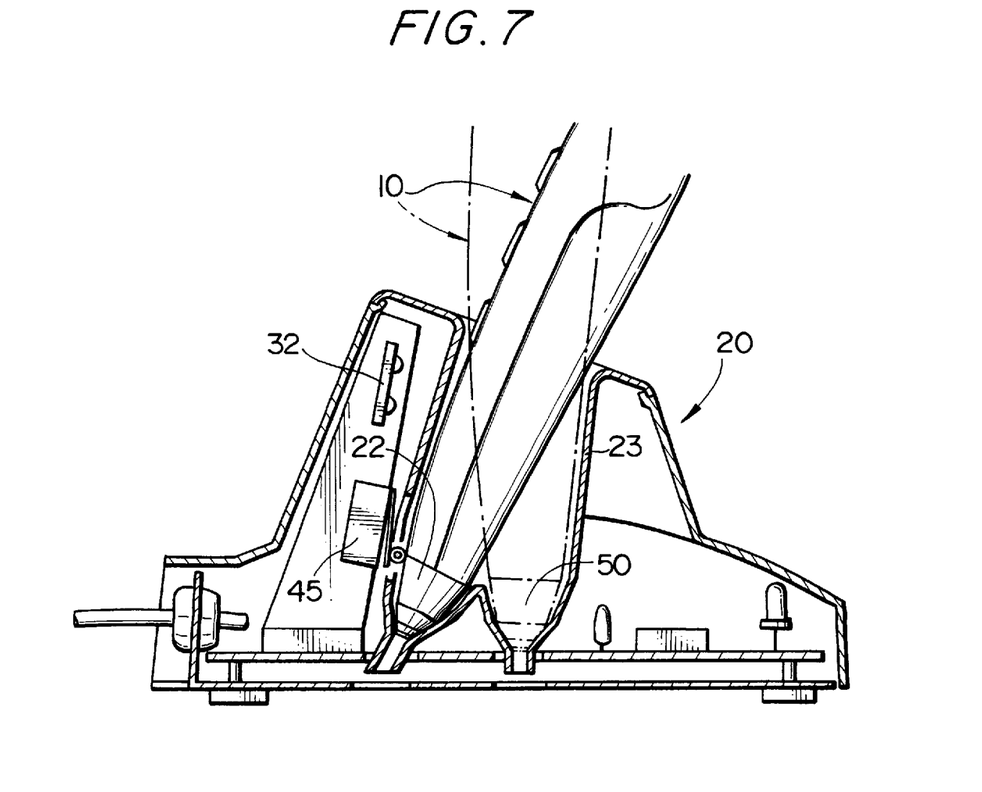
FIGS. 7 and 8 are fragmentary sectional views each showing another modification of the illustrative embodiment.

The above stand 20 formed with two pits 22 and 50 is likely to increase in size. In light of this, as shown in FIG. 7, the pits 22 and 50 may extend downward from a single inlet and may be angled relative to each other. In this case, the scanner 10 enters the auxiliary pit 50 when inserted in an upright position or enters the communication pit 22 when inserted in an inclined position.

Figure 8:
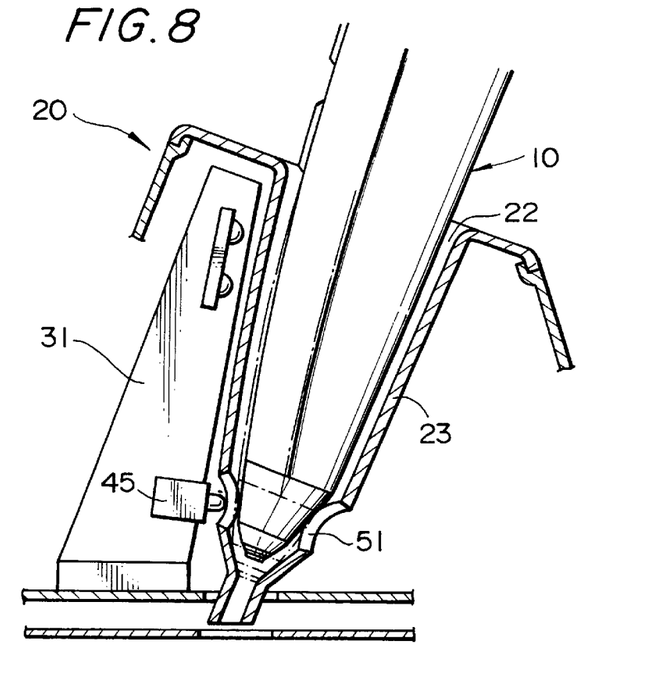

FIG. 8 shows the stand 20 configured to reduce the size. As shown, the hollow member 23 forming the communication pit 22 has a constricted portion 51 in the vicinity of its bottom. The constricted portion 51 is formed of rubber or similar elastic material. The sensor 45 implemented by a limit switch and mounted on the auxiliary circuit board 31 has its feeler abutting against the constricted portion 51. When the operator lightly inserts the scanner 10 in the communication pit 22 for simply putting it on the stand 20, the scanner 10 stops at a position where its tip portion is caught by the constricted portion 51, as indicated by a solid line in FIG. 8. In this condition, the sensor 45 does not operate and prevents power to be fed to the stand 20. To transfer data from the scanner 10 to the stand 20, the operator pushes the scanner 10 deep into the pit 22 to a position indicated by a phantom line. At this instant, the scanner 10 forces the constricted portion 51 outward and thereby operates the sensor 45 via the feeler. As a result, power is fed to the stand 20. As for the rest of the construction, the stand 20 is identical with the stand 20 shown in any one of FIGS. 3, 5A and 5B.

Figure 9:
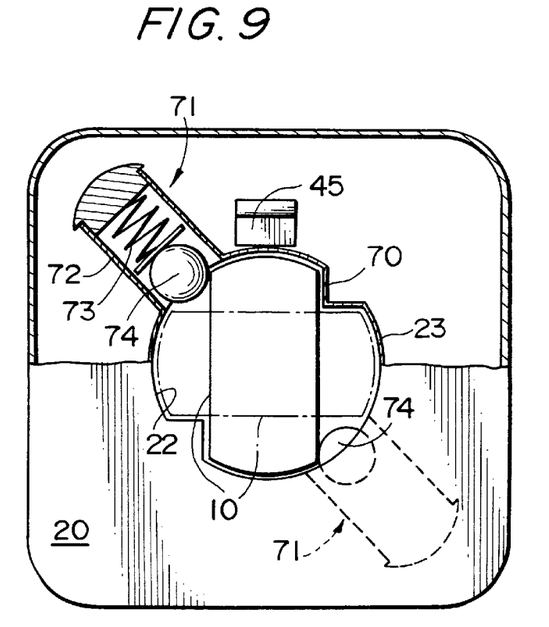
FIG. 9 is a horizontal sectional view showing another modification of the illustrative embodiment.

FIG. 9 shows another modification of the illustrative embodiment constructed such that when the operator inserts the scanner 10 in the communication pit 22 and then rotate it, the scanner 10 actuates the sensor 45. As shown, the scanner 10 has a flat cross-section while the pit 22 has a circular cross-section great enough to allow the scanner 10 to rotate therein. The sensor 45 is implemented by a reflection type photosensor and positioned in the vicinity of the pit 22. The scanner 10 is inserted into the pit 22 in a position indicated by a dash-and-dot line. The scanner 10 is held in this position when it is simply put on the stand 20. In the event of data transfer, the scanner 10 is rotated from the dash-and-dot line position to a solid line position by 90 degrees. In the solid line position, the scanner 10 causes the sensor 45 to operate with the result that power is fed to the stand 20.

The hollow member 23 includes a stop wall 70. A positioning metal fixture 71 is mounted on the hollow member 23 and cooperates with the stop wall 70 to stably hold the scanner 10 in either one of the two positions shown in FIG. 9. The metal fixture 71 is made up of a tube 72, a compression spring 73 received in the tube 72, and a ball 74 affixed to the end of the spring 73. Because the compression spring 73 constantly biases the ball 74 toward the pit 22, the ball 74 protrudes into the pit 22 and maintains the scanner 10 stable in either one of the two positions. Of course, when the scanner 10 is rotated by a force overcoming the force of the spring 73, the ball 74 retracts and allows the scanner 10 to freely rotate.

Figure 10:
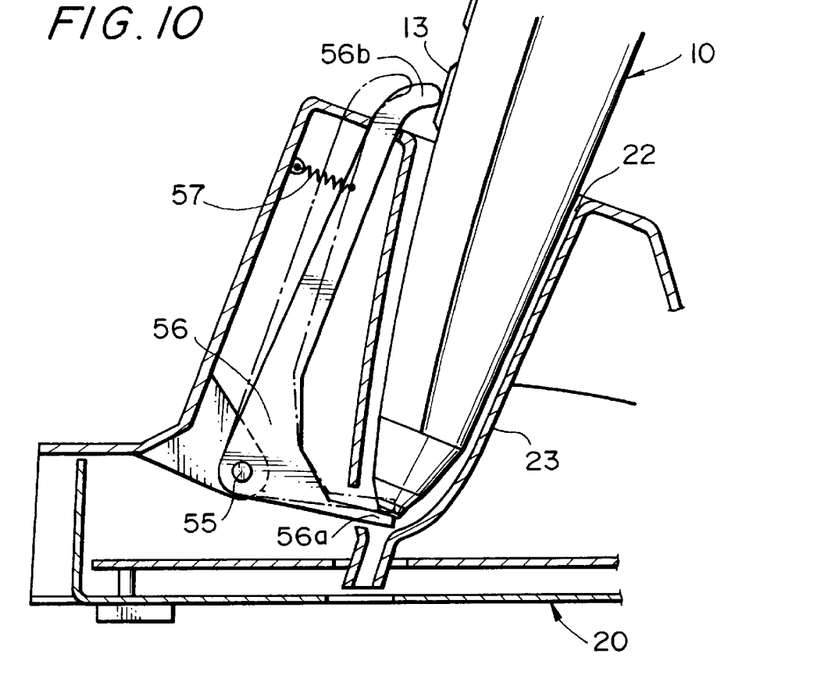
FIGS. 10 and 11 are fragmentary sectional views each showing still another modification of the illustrative embodiment.

FIG. 10 shows another modification of the illustrative embodiment which makes it needless for the operator to push the pushbutton switch 13 assigned to the transmission mode in the event of data transmission. As shown, a generally L-shaped seesaw lever 56 is disposed in the stand 20 and rotatably supported by a fulcrum 55 at its angled portion. The seesaw lever 56 has a lower end 56a protruding into the pit 22 via a hole formed in the hollow member 23 and an upper end 56b slightly bent inward. A coil spring or similar biasing member 57 constantly biases the seesaw lever 56 counterclockwise about the fulcrum 55 toward a position indicated by a dash-and-dot line in FIG. 10.

When the scanner 10 is inserted into the pit 22, its tip abuts against the lower end 56a of the seesaw lever 56. As the scanner 10 is inserted deeper into the pit 22 against the force of the spring 57, it rotates the lever 56 clockwise about the fulcrum 55. As a result, the upper 56b of the lever 56 pushes the pushbutton switch 13 of the scanner 10 and thereby automatically brings the scanner 10 into the transmission mode. The scanner 10 therefore starts interchanging data with the stand 20 immediately.

The stand 20 shown in FIG. 10, like the stand of any one of FIGS. 3, 5A and 5B, additionally includes the infrared transmission/receipt device 32 and sensor 45, although not shown specifically.

Figure 11:
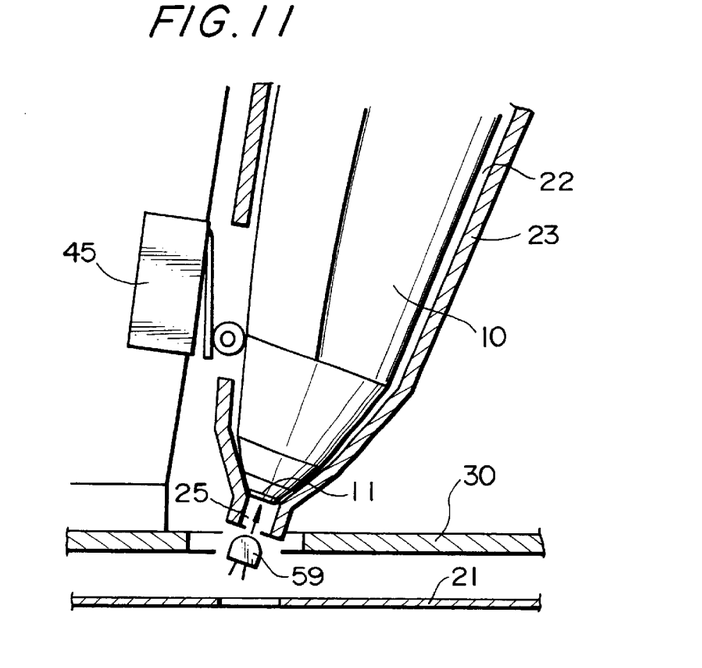

FIG. 11 shows another modification which is a substitute for the modification of FIG. 10. As shown, an LED or similar light emitting device 59 is positioned in the stand and oriented toward the hole 25 of the pit 22. When the scanner 10 is inserted into the pit 22 and operates the sensor 45, the LED 59 emits light. The scanner 10 automatically sets up the transmission mode in response to the light issuing from the LED 59.

Figure 12:
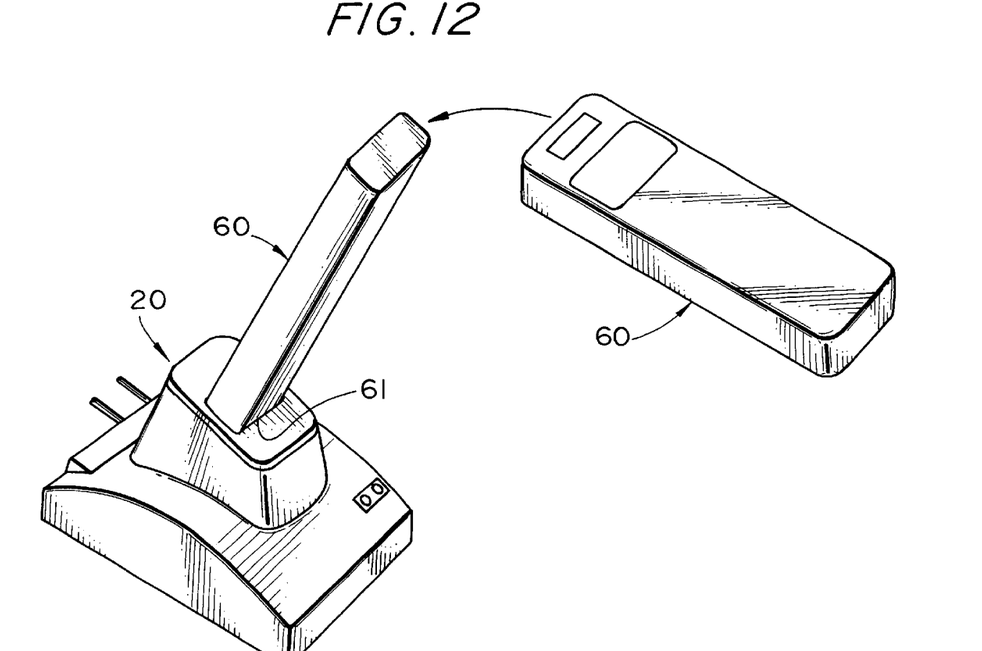
FIG. 12 is a view showing yet another modification of the illustrative embodiment applicable to a CCD (Charge Coupled Device) or laser scanner.

While the above embodiment and its modifications have concentrated on a barcode reader in the form of a pen type scanner, the present invention is, of course, applicable to a CCD scanner, a laser scanner, etc. For example, FIG. 12 shows the stand 20 formed with a communication pit 61 adaptive to a CCD scanner or a laser scanner 60.

Figure 13:
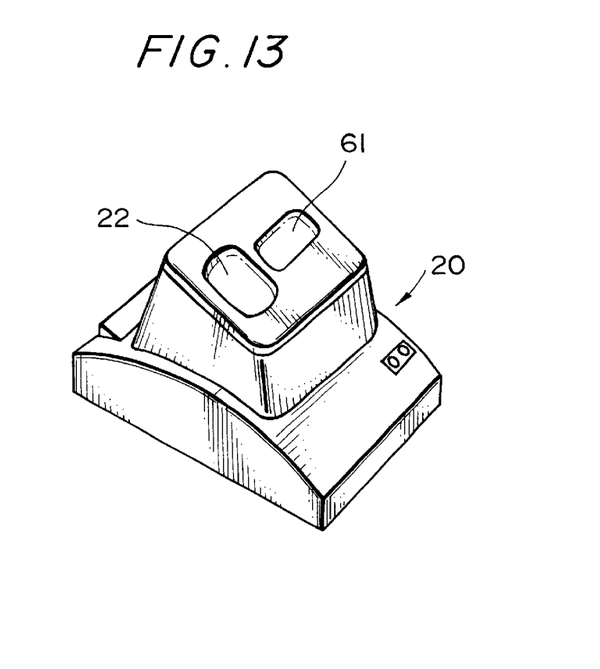
FIG. 13 is an external perspective view showing a further modification of the illustrative embodiment.

As shown in FIG. 13, the stand 20 may be formed with the pit 22 for a pen type scanner and a pit 61 for a CCD scanner or a laser scanner. With this configuration, the stand 20 is capable of dealing with two different kinds of scanners alone.

In summary, it will be seen that the present invention provides a stand with a communication capability for a barcode reader having various unprecedented advantages, as enumerated below.

(1) The stand stably holds a barcode reader having an infrared communicating function in a preselected position. An infrared communication unit is built in the stand for interchanging data with the barcode reader. An infrared transmission/receipt device constituting the communication unit is located to face an infrared transmission/receipt device included in the barcode reader when the reader is mounted to the stand. The transmission/receipt device of the stand and that of the barcode reader interchange infrared rays, so that data stored in the reader can be surely transferred to a host computer. This solves a problem with the conventional barcode reader communicable with an infrared communication unit by being held by hand that its communication port is dislocated to obstruct accurate data transfer. Further, the stand of the present invention allows the barcode reader to be simply put thereon when the reader is not used and therefore to be easily picked up any time.

(2) A buffer memory is built in the infrared communication unit for temporarily storing data received from the barcode reader. When the host computer is not ready to receive data, the barcode reader is capable of transferring stored data to the buffer memory and can therefore be used to read the next barcode immediately. The data temporarily stored in the buffer memory is transferred to the host computer as soon as the computer becomes ready to receive it. This obviates the waiting time of the barcode reader and thereby enhances efficient operation. In addition, power available with a battery disposed in the barcode reader is consumed little.

(3) The stand is formed with a communication pit for receiving the tip portion of the barcode reader in a preselected position. This allows the barcode reader to be easily mounted and dismounted from the stand and simplifies the structure of the stand. Further, because the barcode reader allows its switch to be operated even when received in the communication pit, data can be surely interchanged in a stable condition.

(4) The barcode reader with an infrared communicating function is available in some different forms including a pen type scanner, a CCD scanner and a laser scanner. At POS (Point of Sale) cites, two or more of such different kinds of barcode readers are sometimes used. In such a case, preparing a particular stand for each of the barcode readers is undesirable from the cost and space standpoint. The stand of the present invention is formed with a plurality of communication pits each having a particular shape matching with a particular barcode reader.

(5) A sensor responsive to the barcode reader inserted into the communication pit is disposed in the stand. Only when the sensor senses the barcode reader, power is fed to the infrared communication unit of the stand. That is, power is fed to the stand only when the barcode reader is received in the communication pit, causing the stand to wait for data. This successfully saves power to be consumed by the stand. The sensor may be implemented as, e.g., a mechanical limit switch or an optical reflection type photosensor.

(6) The stand is formed with an auxiliary pit in addition to the communication pit. The auxiliary pit is also capable of receiving the tip portion of the barcode reader, but not provided with an infrared communication unit. When the barcode reader should only be put on the stand without any data transfer, it is inserted into the auxiliary pit. In this condition, the stand does not consume power at all. When the barcode reader is inserted into the communication pit for data transfer, the sensor senses it and causes the communication unit to start operating. This is also successful to save power to be consumed by the stand.

(7) The communication pit and auxiliary pit formed in the stand extend from a single inlet. The barcode reader is inserted into either one of the two pits, depending on its angle. The stand is therefore compact in configuration. The communication pit is, of course, provided with the sensor.

(8) The sensor does not operate when the barcode reader is simply put in the communication pit, but operates when the reader put in the pit is moved in a preselected direction. The barcode reader is simply put in the communication pit when it should be simply placed on the stand. In this condition, the sensor does not operate and prevents power to be fed to the stand, thereby saving power. When the barcode reader put in the communication pit is moved in the preselected direction for data communication, the sensor operates and causes power to be fed to the stand. The stand needs only one pit and has therefore a compact configuration.

(9) Assume that the barcode reader put in the communication pit is moved in its axial direction. Then, when the barcode reader is pushed deeper into the communication pit, the sensor operates. Specifically, the communication pit includes a constricted portion implemented by rubber or similar elastic material. When the barcode reader is pushed deeper into the communication pit, it forces the constricted portion outward and thereby turns on the sensor implemented by a limit switch. Alternatively, the barcode reader may actuate the sensor when rotated about its axis within the communication pit.

(10) When the barcode reader is inserted into the communication pit, the pit automatically activates the infrared communicating function of the barcode reader. This not only saves power available with a battery stored in the barcode reader, but also allows data transfer to begin as soon as the barcode reader is inserted into the communication pit.

(11) To implement the above automatic start of the barcode reader mechanically, use is made of a seesaw lever rotatably mounted on the stand. When the barcode reader is inserted into the communication pit, its tip pushes one end of the seesaw lever with the result that the other end of the lever pushes a pushbutton switch for transmission mounted on the reader. This activates the infrared communicating function of the barcode reader. Such a configuration is similarly applicable to a conventional barcode reader.

(12) To implement the automatic start of the barcode reader optically, a light emitting device is mounted on the stand in such a manner as to face the tip of the barcode reader. When the barcode reader is inserted into the communication pit, the light emitting device turns on and automatically activates the infrared communicating function of the reader.

(13) A hole is formed in the bottom of the communication pit of the stand. Dust apt to deposit in the pit due to repeated mounting and dismounting of the barcode reader surely drops via the above hole. This saves time and labor for removing such dust and prevents, e.g., hard dust from scratching the tip of the barcode reader.

Various modifications will become possible for those skilled in the art after receiving the teachings of the present disclosure without departing from the scope thereof.

What is claimed is:

1. A stand for a barcode reader, comprising:

holding means having a communication pit for holding the barcode reader;

an infrared communication means implemented by an infrared transmission/receipt means for interchanging data with the barcode reader;

wherein said infrared transmission/receipt means of said infrared communication means is so positioned as to face an infrared transmission/receipt means of said barcode reader when said barcode reader is held by said holding means; and sensor means for sensing the barcode reader being inserted into said communication pit, wherein power is fed to said infrared communication means when said sensor means senses said barcode reader and wherein said barcode reader is movable in said holding means from a storage position in which said sensor is not activated to a position in which said sensor is activated to store data received from said barcode reader.

2. A stand as claimed in claim 1, wherein said infrared communication means comprises a buffer memory for temporarily storing data received from the barcode reader.

3. A stand as claimed in claim 1, wherein said holding means comprises at least one communication pit for receiving a tip portion of the barcode reader.

4. A stand as claimed in claim 3, further comprising sensor means for sensing the barcode reader inserted into said communication pit, wherein power is fed to said infrared communication means when said sensor means senses said barcode reader.

5. A stand as claimed in claim 3, wherein when the barcode reader is inserted into said communication pit, the infrared transmission/receipt device of said barcode reader is caused to automatically start operating.

6. A stand as claimed in claim 5, further comprising a light emitting means for emitting light toward the barcode reader when said barcode reader is inserted into said communication pit, wherein the infrared transmission/receipt means of said barcode reader starts operating in response to said light.

7. A stand as claimed in claim 3, wherein a hole is formed in an end of one of said communication pit and an auxiliary pit for causing dust to drop therethrough.

8. A stand as claimed in claim 1, wherein said sensor means operates when the barcode reader is inserted into said communication pit and then moved in a particular direction.

9. A stand as claimed in claim 8, wherein said sensor means operates when the barcode reader is inserted into said communication pit and is then pushed deeper into said communication pit in an axial direction.

10. A stand for a barcode reader including an infrared transmission/receipt device, comprising:
    holding means for holding the barcode reader;
    infrared communication means implemented by an infrared transmission/receipt means for interchanging data with the barcode reader;
    wherein said infrared transmission/receipt means of said infrared communication means is so positioned as to face said infrared transmission/receipt means of said barcode reader when said barcode reader is held by said holding means and wherein said holding means comprises at least one communication pit for receiving a tip portion of the barcode reader; and
    sensing means for sensing the barcode reader being inserted into said communication pit wherein power is fed to said infrared communication means when said sensor means senses said barcode reader and wherein said holding means further comprises an auxiliary pit for receiving the tip portion of the barcode reader, but not including an infrared communication means.

11. A stand as claimed in claim 10, wherein a hole is formed in an end of one of said communication pit and said auxiliary pit for causing dust to drop therethrough.

12. A stand for a barcode reader including an infrared transmission/receipt device, comprising:
    holding means for holding the barcode reader;
    infrared communication means implemented by an infrared transmission/receipt means for interchanging data with the barcode reader;
    wherein said infrared transmission/receipt means of said infrared communication means is so positioned as to face said infrared transmission/receipt means of said barcode reader when said barcode reader is held by said holding means; and
    wherein said holding means comprises at least one communication pit for receiving a tip portion of the barcode reader and an auxiliary pit for receiving the tip portion of said barcode reader exclusive of said infrared communication means; and
    sensing means for sensing the barcode reader being inserted into the said communication pit wherein power is fed to said infrared communication unit when said sensor means senses said barcode reader means and wherein said communication pit and said auxiliary pit extend from a single inlet and selectively receive the barcode reader, depending on an angle at which said barcode reader is inserted.

13. A stand for a barcode reader including an infrared transmission/receipt device, comprising:
    holding means for holding the barcode reader;
    infrared communication means implemented by an infrared transmission/receipt means for interchanging data with the barcode reader;
    wherein said infrared transmission/receipt means of said infrared communication means is so positioned as to face said infrared transmission/receipt device of said barcode reader when said barcode reader is held by said holding means; and
    wherein said holding means comprises at least one communication pit for receiving a tip portion of the barcode reader; and
    sensing means for sensing the barcode reader being inserted into said communication pit, wherein power is fed from said infrared communication means when said sensor means senses said barcode reader;
    wherein said sensor means operates when said barcode reader is inserted into said communication pit and is then moved in a particular direction; and
    wherein said sensor means operates when the barcode reader is inserted into said communication pit and is then rotated about an axis thereof.

14. A stand for a barcode reader including an infrared transmission/receipt device, comprising:
    holding means for holding the barcode reader;
    infrared communication means implemented by an infrared transmission/receipt means for interchanging data with the barcode reader;
    wherein said infrared transmission/receipt means of said infrared communication means is so positioned as to face said infrared transmission/receipt device of said barcode reader when said barcode reader is held by said holding means, wherein said holding means comprises at least one communication pit for receiving a tip portion of the barcode reader;
    wherein when the barcode reader is inserted into said communication pit, the infrared transmission/receipt device of said barcode reader is caused to automatically start operating and wherein said holding means comprises a seesaw lever rotatable such that when the barcode reader is inserted into said communication pit, a tip of said barcode reader pushes one end of said seesaw lever and thereby causes said seesaw lever to bodily rotate with the result that the other end of said seesaw lever pushes a pushbutton switch for transmission provided on said barcode reader, thereby causing the infrared transmission/receipt device of said barcode reader to start operating.

15. A stand for a barcode reader including an infrared transmission/receipt device, comprising:
    holding means for holding the barcode reader; and
    infrared communication means implemented by an infrared transmission/receipt means for interchanging data with the barcode reader;
    wherein said infrared transmission/receipt means of said infrared communication means is so positioned as to face said infrared transmission/receipt means of said barcode reader when said barcode reader is held by said holding means and wherein said holding means comprises a plurality of communication pits each for receiving a particular one of a plurality of barcode readers each having a particular configuration,
    wherein said holding means further comprises an auxiliary pit for receiving a tip portion of said barcode reader, but not including an infrared communication means.

16. A stand as claimed in claim 15, further comprising sensor means for sensing the barcode reader inserted into any one of said plurality of communication pits, wherein power is fed to said infrared communication means when said sensor means senses said barcode reader.

17. A stand as claimed in claim 16, wherein said sensor means operates when the barcode reader is inserted into any one of said plurality of communication pits and then moved in a particular direction.

18. A stand as claimed in claim 17, wherein said sensor means operates when the barcode reader is inserted into any one of said plurality of communication pits and then pushed deeper into the communication pit in an axial direction.

19. A stand as claimed in claim 17, wherein said sensor means operates when the barcode reader is inserted into any one of said plurality of communication pits and then rotated about an axis thereof.

20. A stand as claimed in claim 15, wherein said plurality of communication pits and said auxiliary pit extend from a single inlet and selectively receive said barcode reader, depending on an angle at which said barcode reader is inserted.

21. A stand as claimed in claim 15, wherein when the barcode reader is inserted into any one of said plurality of communication pits, the infrared transmission/receipt means of said barcode reader is caused to automatically start operating.

22. A stand as claimed in claim 21, wherein said holding means comprises a seesaw lever rotatable such that when the barcode reader is inserted into any one of said plurality of communication pits, a tip of the barcode reader pushes one end of said seesaw lever and thereby causes said seesaw lever to bodily rotate with the result that the other end of said seesaw lever pushes a pushbutton switch for transmission provided on said barcode reader, thereby causing the infrared transmission/receipt means of said barcode reader to start operating.

23. A stand as claimed in claim 21, further comprising light emitting means for emitting light toward the barcode reader when said barcode reader is inserted into any one of said plurality of communication pits, wherein the infrared transmission/receipt device of said barcode reader starts operating in response to said light.

24. A stand as claimed in claim 15, wherein a hole is formed in an end of each of said plurality of communication pits or said auxiliary pit for causing dust to drop therethrough.

25. A stand for an image reading means having a communicating function, comprising:

holding means for holding the image reading device when said image reading means is mounted to said stand; and communication means for interchanging data with the image reading means;

the image reading means being so positioned and held by said holding means as to be capable of communicating with said communication means; and sensor means for sensing said image reading means being inserted into said holding means, wherein power is fed to said communication means when said sensor means senses said image reading means and wherein said image reading means is movable in said holding means from a storage position in which said sensor means is not activated and a position in which said sensor means is activated to store data received from said barcode reader.

26. A stand as claimed in claim 25, wherein the image reading means comprises a barcode reader including an infrared transmission/receipt means said communication means including infrared transmission/receipt means for interchanging data with said infrared communication/receipt means of said barcode reader.

27. A stand as claimed in claim. 26, wherein said infrared transmission/receipt means of said infrared communication unit faces said infrared transmission/receipt means of said barcode reader when the barcode reader is held by said holding means.

* * * * *

UNITED STATES PATENT AND TRADEMARK OFFICE
CERTIFICATE OF CORRECTION

PATENT NO.    : 6,405,926 B1
DATED         : June 18, 2002
INVENTOR(S)   : Matsuo Yomogida et al.

It is certified that error appears in the above-identified patent and that said Letters Patent is hereby corrected as shown below:

<u>Column 3,</u>
Line 14, change "removaly" to -- removably --;

<u>Column 4,</u>
Line 16, change "Centra" to -- Central --;
Line 39, change "58" to -- 5B --;
Line 46, change "is successful" to -- succeeds in saving --;
Line 64, change "to save" to -- in saving --;

<u>Column 5,</u>
Line 27, change "rotate" to -- rotates --;

<u>Column 7,</u>
Line 39, change "to save" to -- in saving --;

Signed and Sealed this

Twenty-fourth Day of June, 2003

JAMES E. ROGAN
*Director of the United States Patent and Trademark Office*